Sept. 20, 1971 J. E. HOTCHKISS 3,605,730
ILLUMINATING ENDOSCOPE WITH IMPROVED GRIPPING MEANS
Filed Aug. 27, 1968 2 Sheets-Sheet 1
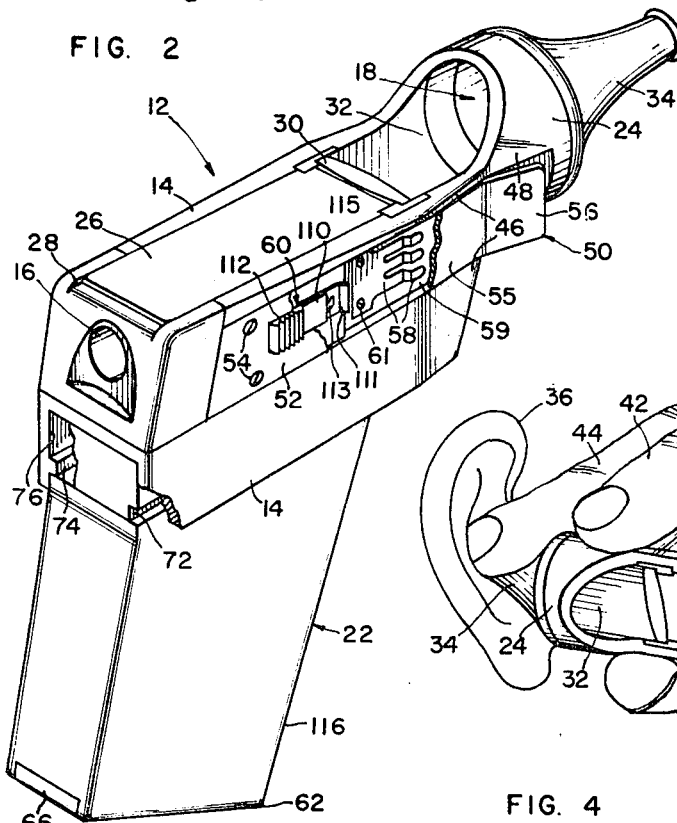
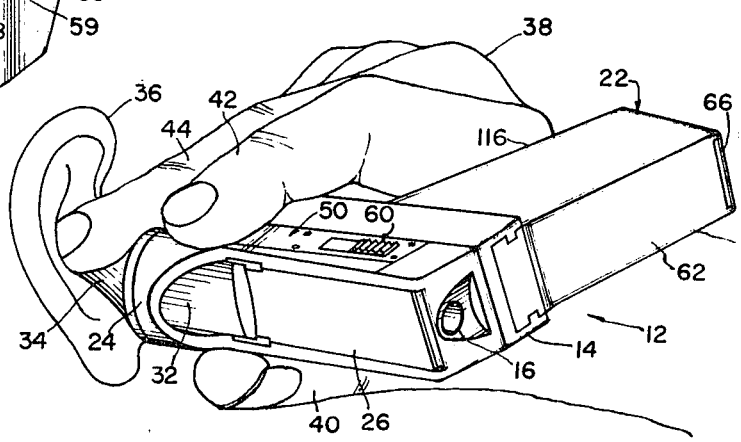
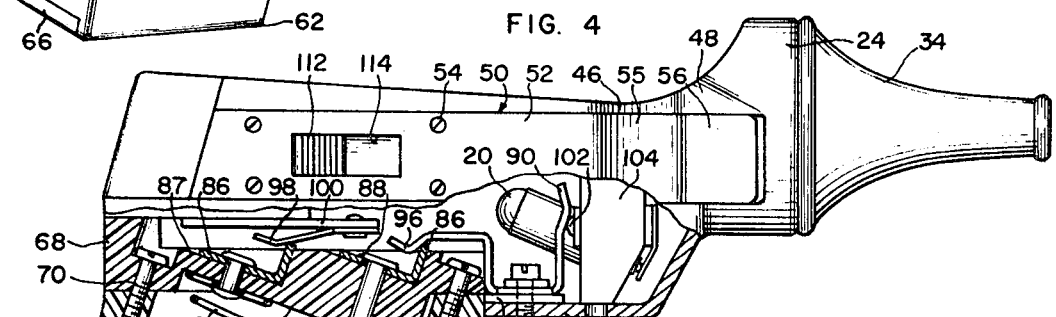
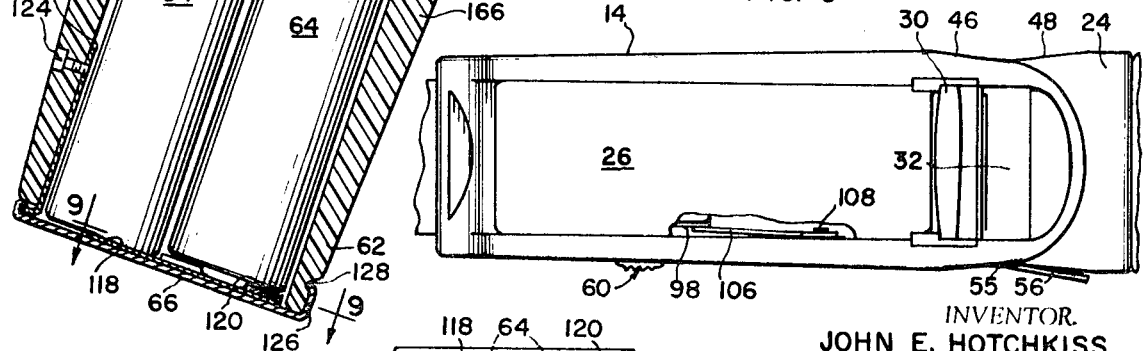
INVENTOR.
JOHN E. HOTCHKISS
BY Warren, Rubin,
Brucker & Chickering
ATTORNEYS

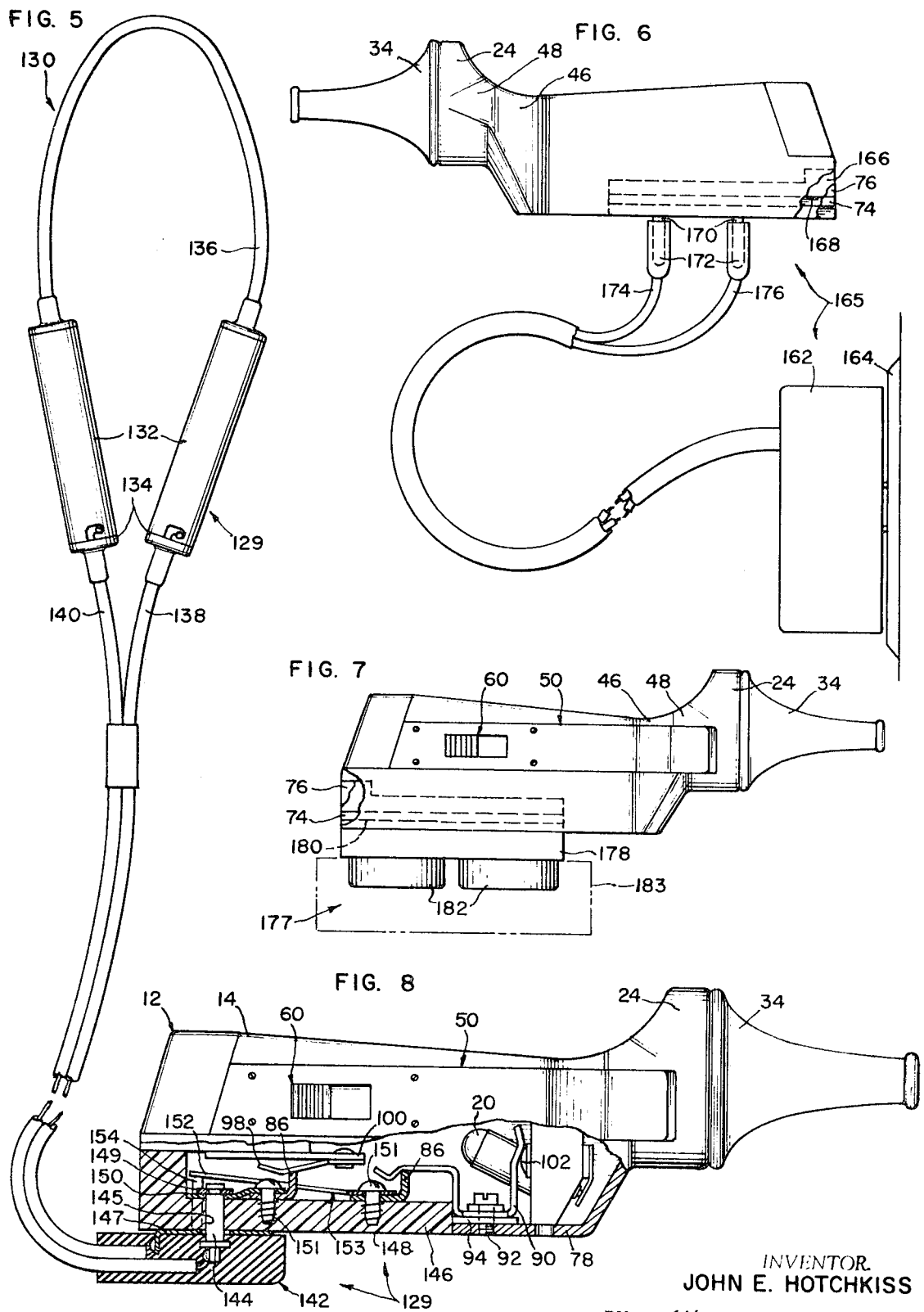

United States Patent Office 3,605,730
Patented Sept. 20, 1971

3,605,730
ILLUMINATING ENDOSCOPE WITH IMPROVED
GRIPPING MEANS
John E. Hotchkiss, Corte Madera, Calif., assignor to
Hotchkiss Instruments, Inc.
Continuation-in-part of application Ser. No. 675,811,
Oct. 17, 1967. This application Aug. 27, 1968, Ser.
No. 755,661
Int. Cl. A61b 1/22
U.S. Cl. 128—9
8 Claims

ABSTRACT OF THE DISCLOSURE

An endoscope for illuminating and viewing an area of an organ, having a housing with aligned viewing and sight apertures and a pair of oppositely disposed holding surfaces on the exterior of the housing adjacent the sight aperture enabling the holding of the housing with the thumb and a finger of a holding hand so that remaining fingers of that hand are positioned to manipulate and move the organ. The housing includes an interface for mechanically mounting an electrical power source to the housing which energizes a light source in the housing. A pressure-sensitive switch is disposed adjacent the sight aperture for actuation by a finger holding the housing. The power source is located on the side of the holding thumb generally opposite the remaining fingers of the holding hand to prevent the power source from interfering with the use of the remaining fingers for manipulation of the organ. The power source is selected from conventional batteries, rechargeable batteries, and household current drawing transformers. Terminals electrically connecting the light source with the power source are constructed to simultaneously releasably secure the latter to the housing.

RELATED APPLICATIONS

This is a continuation-in-part application of the presently pending patent application bearing Ser. No. 675,811, filed Oct. 17, 1967 for Endoscope Having Improved Illumination System, and is further related to the commonly owned co-pending patent applications bearing Ser. No. 755,660, filed Aug. 27, 1968, for Endoscope With Coincident Illumination and Viewing, and Ser. No. 756,-112, filed Aug. 29, 1968, for Endoscope for Photographic Recording.

BACKGROUND OF THE INVENTION

This invention relates to endoscopes and more particularly to an endoscope specifically designed to be held by two fingers of a holding hand at a location on the housing of the device which positions the other fingers of that hand for manipulation and/or moving of the organ being viewed.

Prior art self-illuminating endoscopes are characterized by a frame mounting a speculum and a handle depending from the frame for grasping by the holding hand of the person using the endoscope. The handle ordinarily contains an electric power source such as batteries. Since the handle is remote from the speculum, the user of the endoscope must use his other hand for the moving of the pinna to straighten the ear canal and permit the viewing of the tympanic membrane. This is satisfactory as long as the organ is merely examined. Frequently, however, the organ requires to be worked or operated on with tools which are inserted through the speculum. With prior art devices this is impossible since the user already requires both hands for merely viewing the organ.

Attempts have, therefore, been made to construct an endoscope which can be held with the same hand that manipulates the objected to be viewed. Since the weight and relative position of the power supply of known endoscopes with self-illumination make it difficult, if not impossible, to hold the device with two fingers positioned adjacent the speculum, endoscopes have been used which comprise only a speculum. Light is placed on the object by a head mirror reflecting a beam of light from a remote light source through the speculum. This arrangement has the disadvantage of requiring a high degree of manual skill to coordinate the holding of the speculum, properly positioning the head mirror to illuminate the organ through the speculum, and simultaneously manipulate the operating tool. In addition, this arrangement requires idealized office conditions and a minimum of 36 inches of space for the system.

SUMMARY OF THE INVENTION

The present invention provides an endoscope for illuminating and viewing an area of an organ wherein the device is held in the same hand used to manipulate the object being viewed.

Briefly, the invention comprises an elongate housing having a viewing aperture at one end and an in-line sight aperture at the other end with a sight passage therebetween. The housing is formed with holding areas adjacent the sight passage whereby the device can be held by two fingers of the holding hand while the other fingers of that same hand are free and positioned to manipulate the organ. The endoscope further includes a light mechanically joined with the housing for illuminating the area to be viewed, and a source of power electrically coupled to the light.

In the presently preferred form of the invention the holding areas are defined by opposing, substantially flat holding surfaces located on each side of the sight passage. This arrangement permits the endoscope to be held in a pencil-like manner. The light is connected in a circuit with a switch having an operating lever disposed to overlay one of the flat holding surfaces. This enables the light to be operated by the same force used to hold the device. The housing further includes an interface for receiving a mounting member of a power source. The interface is located to dispose the power source at a non-interfering location when the device is being used. The mounting member may be attached to any one of various power source configurations and is secured to the housing with a quick-release snap connector which both mechanically holds the source in place and electrically connects the power source and the light.

When used to view in the ear, the endoscope is advantageously held with the thumb and index finger of one hand, while another finger of that hand, say the middle finger moves, pushes or pulls the ear to straighten the ear canal and provide an unobstructed view of the tympanic membrane. This leaves the other hand free for manipulating a tool in the ear, or for any other operation which might be necessary while viewing in the ear.

Since the endoscope of the present invention includes as an integral part, its own light source, the need for independent, secondary devices, such as a head mirror is eliminated.

BRIEF DESCRIPTION OF THE DRAWINGS

FIG. 1 is a perspective view of an endoscope constructed according to the present invention as used in the examination of a human ear and illustrates the simultaneous holding and moving of the ear with a single hand;

FIG. 2 is a perspective view, with parts broken away, of the endoscope shown in FIG. 1;

FIG. 3 is a fragmentary plan view, with parts broken away, of the endoscope shown in FIG. 2;

FIG. 4 is an elevational view, with parts broken away, of the endoscope shown in FIG. 2;

FIG. 5 is a fragmentary plan view of an alternate power supply for the endoscope;

FIG. 6 is an elevational view of the endoscope with an electric transformer as its power supply;

FIG. 7 is an elevational view of the endoscope in which the power supply comprises rechargeable batteries;

FIG. 8 is a side elevational view, with parts broken away, of the endoscope in which the power supply is connected with the endoscope by a swivel connector; and FIG. 9 is a plan view of a cover for the power supply shown in FIG. 4 and is taken on line 9—9 of FIG. 4.

DESCRIPTION OF THE PREFERRED EMBODIMENTS

Referring to FIGS. 1 through 3, an endoscope 12 comprises an elongate housing 14 having a viewing aperture 16 and a sight aperture 18 forming ends of a sight passage, a light source 20 (shown in FIG. 4), and a power source 22 connected to the housing and electrically coupled to the light source via terminals and switches, as more fully discussed hereinafter. As used herein, the term "sight passage" denotes that unobstructed space between the viewing and the sight apertures through which the sight aperture is visible from the viewing aperture, or vice versa. The lighting and optical system disposed inside the housing is fully described and shown in the above referred to co-pending patent application entiled "Endoscope With Coincident Illumination and Viewing" and is, therefore, not further disclosed herein except as necessary to fully understand the present invention.

The housing has a generally U-shaped cross section over most of its length starting from the viewing aperture and terminating at a cylindrical portion 24 which defines the sight aperture 18. A housing cover 26 is slideably disposed in guides 28 and when in place closes the housing to protect the interior thereof from contamination. The cover terminates at a lens 30 of the optical system (not further shown herein) of the endoscope so that a curved opening 32 between the rectangular and cylindrical portions of the housing is not closed by the cover and remains open. Operating tools (not shown) may be inserted into the ear through opening 32, past sight aperture 18 and through a speculum 34. The opening 32, however, may be closed by the thumb of the operator, to enable pneumoscope, as fully described in the above referred to co-pending patent application.

The housing can be thought of as comprising three portions: the first portion serving to house the light source and reflector (optics) and having a generally rectangular cross section; the second portion having a generally annular geometry and designed to receive and hold a speculum tip, and a third portion secured to the end of the first portion and integrally joining the second portion to the first portion. The dimension of the third portion of the housing transverse to the longitudinal axis of the first portion of the housing is smaller than the like dimension of the other two housing portions at the point of joinder so as to form concave surfaces between the first and second housing portions.

In the examination of organs having cavities, such as the ear canal, it is often necessary to manipulate the organ for proper viewing. In the case of the ear, the ear canal (not shown) must be straightened to obtain a clear view of the tympanic membrane. This usually requires the pulling or pushing of the ear pinna 36 with one or more fingers. If the straightening of the ear canal cannot be performed by the hand holding the endoscope, then the viewer cannot use tools to operate in the ear canal or on the membrane, etc. Failure to straighten the canal, on the other hand, will provide the viewer with an inadequate or possibly non-existing view of the area to be worked on while the work is being performed. This often leads to incomplete work and is obviously unsatisfactory.

Housing 14 is, therefore, constructed so that the viewer may hold the endoscope with only two fingers, namely his thumb 40 and index finger 42, while his middle finger 44 is in position and remains free to move the pinna such as by pushing thereon (as shown in FIG. 1). To enable the simultaneous use of the holding hand for holding the endoscope and moving the ear, it is, of course, necessary to not only enable the holding of the endoscope with only two fingers of one hand but to position the two holding fingers adjacent the ear during the examination thereof.

Consequently, the housing 14 includes holding areas defined by flat surfaces 46 and 48 adjacent the speculum mounting cylindrical portion 24 and disposed on each side of the housing to provide convenient areas for the thumb and index finger of the holding hand. The flat surfaces are contiguous and preferably at a slight angular inclination with respect to each other, as best seen in FIG. 3, to provide a slightly concave area for receiving the fingers. The flat area assure that when gripped, the instrument will not rotate from the desired orientation about the longitudinal axis of the endoscope. There are holding areas (surfaces 46 and 48) on each side of the sight passage so that when the holding fingers grip the endoscope it is held in a manner similar to that in which a pencil is held. While gripping the holding surface of the housing, speculum 34 of the endoscope is inserted into the ear; the middle finger 44 is automatically positioned closely adjacent the ear pinna and the latter can thus be moved to straighten the ear canal to provide a clear and unobstructed view of the tympanic membrane. Thus viewing and positioning of the organ is easily accomplished with one hand.

As is discussed more fully hereinafter, power supply 22 frequently comprises electric batteries which as is well known discharge rapidly when subjected to extended drain, as when coupled with light source 20 for long periods. The provision of a conventional on-off switch invites inadvertently failing to turn the switch off after the use of the endoscope so that the light source may continue to be connected with the batteries even after the light is no longer required. The present invention provides a convenient, self-opening, pressure-sensitive switch which automatically assures that the light source is disconnected from the power source when the instrument is not in use. Such a pressure-sensitive switch 50 is secured to the exterior of housing 14 and includes an elongate operating lever 52 secured to the housing by screws 54. A free end of lever 52 extends over at least a substantial portion of the flat holding surfaces 46 and 48 on one side of the housing (see FIGS. 2 and 4) and is comprised of portions 55 and 56 which are shaped to overlay the flat holding surfaces 46 and 48. At least one of the flat portions 55, 56 projects outward from its adjacent holding surface of the housing (as best seen in FIGS. 2 and 3) so that the holding finger resting on that side of the housing first contacts the lever. The lever 52 is formed of spring material and when relaxed is positioned away from switch contact 58, also secured to housing 14, and electrically insulated therefrom by an insulation pad 59 and insulated screws 61. Thus the endoscope can be placed adjacent the ear, the speculum can be inserted into the ear canal, while the light source remains de-energized. After the endoscope is positioned, the holding force on the end of lever 52 is increased until the lever establishes electrical contact with contact 58, whereby the light source is energized as more fully described hereinafter. This arrangement provides automatic operation of the pressure-sensitive switch with one of the holding fingers. Since the light remains energized as long as the instrument is being held, and automatically becomes de-energized when released, the possibility of accidentally leaving the energy source coupled to the light is eliminated. A second electric switch 60 is provided to couple the light and power sources independently of the pressure-sensitive switch 50, when a more permanent connection is needed as during extended operations.

Referring to FIGS. 1 and 4, in a presently preferred embodiment of the invention, power source 22 comprises a receptacle 62 in which a pair of conventional elongate batteries 64 are stored and form a source of an electrical potential for light 20. One end of the receptacle is closed by a removable cover 66 while the other end is secured to a mounting member 68 as by a pair of threaded bolts 70. The sides of the mounting member at the junction with the receptacle each have a recess formed along their full length (see FIG. 2). These recesses, together with the end of the receptacle itself define elongate grooves 72 which receive rails 74 which form a portion of an interface 76 of housing 14. The interface extends from the end of housing 14 proximate the viewing aperture and the length of the interface equals the length of the mounting member so that the latter is flush with the end of the housing when the two are fully engaged (see FIG. 4). A bottom member 78 of the housing acts as a stop to insure proper positional relationship between the member and interface.

The interface 76 of housing 14 is disposed within the volume defined by the planar walls of the housing containing the light source to make it possible to provide electrical energy to the light source at the interface while eliminating any cumbersome depending portions (see FIGS. 6, 7, and 8).

The mounting member includes an interior face 80 which extends generally perpendicular to the batteries 64 (when in place) and mounts a pair of contact springs 82 as with rivets 84 which engage the batteries and electrically couple them with terminals 86 secured to outer faces 87 and 88 of the mounting member. The springs also bias the batteries against electrically conductive cover 66 to serially couple the batteries in a conventional manner.

Referring now to FIG. 4, a first spring loaded contact strip 90 is secured to the housing by a screw 92 but insulated therefrom by an interposed strip of insulating material 94. Strip 90 includes an arm portion 96 extending from bottom member 78, past the position where the end of mounting member 68 extends when clipped to the housing. A detent is formed on the end of arm portion 96 and operates to firmly grasp the end of the terminal 86 when the power source is operatively joined to the housing. The engagement of a spring force on the terminal which retains mounting member 68 (and thus receptacle 62) in firm engagement with the spring contact 90 and thereby secures the mounting member to the housing. The second or outer terminal 86 of the mounting member is similarly engaged by a second spring loaded contact 98 riveted to an insulating plate 100 secured to housing 14. Contact 98 also includes an indentation which engages the upwardly extending free end of the second terminal and thereby further secures the receptacle and mounting member to the housing.

Accordingly, terminals 86 and spring loaded contacts 90 and 98 provide an automatic mechanical snap-in interlock between the housing, and more particularly interface 76, and the power source, more particularly mounting member 68. The snap-in lock securely attaches the two members to each other while permitting their instantaneous removal without the loosening of bolts, fasteners, latches, etc. At the same time, the terminals and contacts provide the necessary electrical connections between the power source, light 20 and switches 50 and 60.

Referring to FIGS. 1, 2 and 4, contact 90 couples the inner terminal 86 with a contact button 102 on a holder 104 for light source 20. Second contact 98 is L-shaped and extends across the width of the housing to adjacent one of the walls defining the housing on which an L-shaped terminal strip 106 is insulated from and mounted on the housing wall with threaded bolts 61 which, on the outside of the wall, mount contact 58. The bolts are disposed in oversized holes (not shown) of the housing fitted with insulating bushings (not shown) to prevent their contact with the housing and becoming electrically connected therewith. Depression of actuating lever 52 of pressure-sensitive switch 50 establishes an electric connection between contact 58 and the housing to thereby energize light 20. Alternatively, switch 60 can be employed for energizing the light. Switch 60 comprises a thin, elongate leaf spring 110 which is arcuate over its length when it is relaxed and which further has a bevelled end 111. Detents 113 of the leaf spring (only one detent is shown in FIG. 2) engage a serrated push button 112 extending outwaardly past lever 52 through an elongate opening 114 in the latter. The push button and leaf spring can be moved towards contact 58 until bevelled end 111 touches contact 58 and thereby electrically connects the latter with the housing to energize light 20. It will be noted that the curved leaf spring biases push button 112 against operating lever 52 to generate frictional forces which prevent switch 60 from becoming inadvertently closed.

Still referring to FIGS. 1, 2 and 4, it will be observed that receptacle 62 of power source 22 has a sloped side 116 extending from bottom member 78 away from the cylindrical portion 24 of the housing toward viewing aperture 16. This feature is important, particularly when batteries 64 are relatively long and project transversely to the sight passage away from the housing to prevent an interference between the power source, i.e. receptacle 62, and the holding hand. Thus, while the endoscope is positioned adjacent the ear, as shown in FIG. 1, the battery receptacle is disposed on the side of thumb 40 and index finger 42 opposite the remaining fingers of holding hand 38 and generally extends past the portion of the holding hand between thumb 40 and index finger 42 to provide full freedom of movement for the remaining fingers and to prevent interference between the holding hand and the receptacle. Depending upon the relative positions of the viewer and the person whose ear is being examined, and upon the operation being performed, whether it be a mere examination of the ear canal or an actual working therein, the endoscope can, of course, be rotated, generally about the axis of its sight passage, so that battery receptacle 62 is positioned at points other than between the thumb and the index finger.

Referring to FIGS. 4 and 9, it is frequently desirable to place batteries 64 in a conventional battery recharger to insure a ready supply of electrical energy and to avoid the necessity of having to replace drained batteries with new ones. The batteries are recharged while disposed in receptacle 62 by placing the latter in a battery recharger (not shown) to couple contacts 86 with terminals (not shown) of the recharger. Contacts 86 of the receptacle must, of course, be correctly polarized which requires a predetermined placement and orientation of the batteries in the receptacle. To that end, cover 66 includes a metallic terminal strip 118 which is of a sufficient length to contact the terminals of both batteries. Since the batteries are in series, their negative and positive terminals, respectively, contact the terminal strip. To correctly place and orient the batteries, a U-shaped insulator 120 is secured to the cover adjacent one end of the terminal strip. The insulator has a width between its legs greater than the diameter of the positive terminal of the batteries but insufficient to permit the larger diameter negative terminal of the other battery from contacting the terminal strip. Only if the batteries are correctly positioned and oriented in the receptacle does the actuation of switches 50 or 60 result in the illumination of light 20. The correct positioning of the batteries assures a correct polarization of contacts 86 so that the receptacle can be inserted in the battery recharger and the batteries can be recharged. Cover 66 is constructed so that it can only be snapped into engagement with a holding spring 122, which is secured to the interior of the receptacle by a screw 124, when insulator 120 is on the right-hand side of the receptacle, as viewed in FIG. 4. In that position a transverse web 126 of the cover engages an indentation 128 on the exterior of the receptacle to provide a snap-in connection between the cover and the receptacle. This makes it impossible to reverse the position of the cover when secured to the receptacle which would reverse the polarization of contacts 86 and prevent a successful recharging of the batteries in the recharger.

It is frequently desirable to use power sources other than the battery receptacle 62 shown in FIGS. 1 through 4 to enable the use of different batteries, such as rechargeable nickel cadmium batteries, electric current from a transformer plugged into a wall outlet supplying electric household current, or to place the power source independently of the endoscope to reduce the latter's weight. This is a primary purpose for universal interface 76; to permit the ready removal of mounting member 68 and the reinstallation of another mounting member 68 which may be constructed with a different form of power source.

Referring to FIGS. 5 and 8, in another preferred embodiment of this invention a power source 129 comprises a neck pack 130 having a pair of independent, tubular receptacles 132 closed by caps 134 and containing batteries (not shown in FIGS. 5 and 8) forming the source of the electric potential for the light (not shown) of the endoscope. The opposite ends of the battery receptacles include openings through which an electric lead 136 simultaneously connects the receptacles and electrically couples the batteries contained therein in series. Lead 136 is long enough to permit placement of the batteries over a person's head and around his neck. Leads 138 and 140 extend through caps 134 and terminate in a swivel connector 142.

The swivel connector has a central, electrically conductive pivot shaft 144 which projects into a bore 145 in a mounting member 146. The mounting member engages interface 76 of housing 14 in the same manner as mounting member 68 (shown in FIG. 2) engages it. The pivot shaft is electrically connected with one of the leads 138, 140 while the other lead is connected to a metallic disc 147 on the swivel connector between the swivel connector and an exterior face 148 of mounting member 146.

The pivot shaft projects past the mounting member into the interior of housing 14 and is there engaged by a spring ring 149 which rotatably retains the swivel connector on the mounting member.

A terminal strip 150 is disposed around pivot shaft 144 between mounting member 146 and spring ring 149 for electric connection with the pivot shaft. Terminal strip 150 and a contact 86 are secured to the mounting member by a fastener such as a bolt 151 threaded into the mounting member.

An elongate contact 154 is disposed in mounting member 146 and positioned within the periphery of disc 147 to be electrically connected with the disc. The contact pin extends through the mounting member into the interior of housing 14 and its end is engaged by a spring loaded arm 152 of a knurled strip 153 which biases the contact pin into engagement with disc 147. Strip 153 is connected to the other one of the contacts 86 by a bolt 151 threaded into mounting member 146.

Thus, when mounting member 146 engages interface 76 lead 138 is electrically coupled with spring loaded terminal 98 on housing 14 via pivot shaft 144, strip 150 and a contact 86. Lead 140 is electrically connected with arm portion 96 of terminal strip 90 on housing 14 via disc 147, contact pin 154, arm 152 of strip 153, and the other contact 86. Swivel connector 142 can be freely rotated 360° to facilitate the handling of the endoscope during use.

Endoscopes provided with a swivel connector and neck pack 130 are lightweight and of a sufficiently small size to permit their placemens in vest pockets of physician's work garments. Thus, they are ideally suited for physician's making daily inspection rounds through hospital wards, for example. Appropriate power sources other than neck pack 130 can, of course, be connected with swivel connector 142.

Referring to FIG. 6 in yet another preferred embodiment of the invention, a power source 165 comprises a mounting member 166 having grooves 168 identical to grooves 72 in FIG. 2 which engage rails 74 of interface 76 of housing 12. The portion of mounting member 166 disposed on the interior of the endoscope housing includes inner and outer contacts engaging the first and second spring loaded terminals to provide the mechanical snap-in lock and electrically connect the light source with the power source. Since the construction of those parts is identical with that shown in FIGS. 4 and 8, it is not further described or illustrated in FIG. 6. The contacts are secured to the mounting member by rivets 170 which extend outwardly past the outer side of the mounting member to form terminal pins. Jacks 172 are slipped over the terminal pins and form the ends of leads 174 and 176 coming from transformer 162, the source of the electric potential for light source (not shown in FIG. 6) of the endoscope. The jacks can be freely disconnected from the terminal pins while the instrument is not in use.

Referring to FIG. 7, another power source 177 comprises a mounting member 178 which is constructed identical to that of the other mounting members shown and described herein, that is it includes L-shaped contacts 86 engaged by spring loaded first and second terminals mounted in housing 12 of the endoscope and grooves 180 engaging protrusions 74 of interface 76 of the housing. Thus, it too embodies the mechanical snap-in locking feature of the interface and the interengagement between the spring loaded contacts and terminals. Secured to the outer side of the mounting members are a pair of rechargeable nickel cadmium batteries 182 forming the source of the electric potential for the light source (not shown in FIG. 7) of the endoscope. Batteries 182 have a stubbed appearance and can be inserted in commonly available battery recharging receptacles 183 sized to engage the nickel cadmium batteries and subject them to a recharging electrical potential. The detailed configuration of the batteries is not repeated herein since it is old as such. This embodiment of the endoscope has the advantage that the endoscope may be stored in a receptacle which doubles as a battery recharger so that the batteries are always automatically charged whenever the endoscope is used. This saves space and is economical and timesaving since it does not require the frequent replacement of the batteries. In all other respects this embodiment is identical to the others described above.

It will be noted that the present invention provides an endoscope which is easily handled and manipulated and affords the viewer the possibility of using his second hand for purposes other than the holding and positioning of the endoscope. Its construction is such that the illumination of its light source can be obtained from any one of a plurality of available power sources by merely engaging the corresponding mounting member with the interface on the endoscope housing and closing the automatically acting snap-in lock.

I claim:

1. In an endoscope having reflector means and light source adapted to be connected to a source of electric power, the endoscope designed for use with a speculum tip, the combination comprising:

a first housing portion defining at one end a viewing aperture, said housing portion being elongated along an axis generally parallel to a sight passage visible through the viewing aperture, said first housing portion containing the light source and reflector means;

a second housing portion of generally annular shape defining a sight aperture visible from said viewing aperture through said sight passage, said second portion adapted to receive and removably secure a speculum tip;

said light source and reflector means designed to direct light through said sight aperture and past a speculum tip;

a third housing portion between said first and second portions integrally securing said second housing portion to the end of said first housing portion opposite the end defining said viewing aperture, said third housing portion having a smaller dimension along an axis transverse to the longitudinal axis of said first housing portion at the location of joinder of said first, second, and third portions than either said first or second housing portions thus forming opposed generally concave areas between said first and second housing portions which serve as holding areas for the endoscope; and electrical switch means electrically connected to said light source and including actuator means disposed in one of said concave areas of said third housing portion whereby said switch is actuated by holding the endoscope at the location specifically provided therefor.

2. The endoscope of claim 1 further comprising a power source interface formed in the bottom wall of said first housing portion wherein said interface is completely confined within the volume defined by the walls of said first housing portion; said interface including a pair of spaced-apart guide rails and at least two electrical contacts.

3. In an endoscope having reflector means and light source adapted to be connected to a source of electric power, the endoscope designed for use with a speculum tip, the combination comprising:

a first housing portion defining at one end a viewing aperture, said housing portion being elongated along an axis generally parallel to a sight passage visible through said viewing aperture, said first portion containing the light source and reflector means and having a generally rectangular cross-section defined by top and bottom walls held at fixed spaced-apart locations by generally parallel spaced-apart side walls;

a second housing portion of generally annular shape defining a sight aperture visible from said viewing aperture through said sight passage, said second portion adapted to receive and removably secure a speculum tip;

said light source and reflector means designed to direct light through said sight aperture and past a speculum tip;

a third housing portion between said first and second portions integrally securing said second housing portion to the end of said first housing portion opposite the end defining said viewing aperture, said third housing portion having a smaller dimension along an axis transverse to the longitudinal axis of said first housing portion at the location of joinder of said first, second, and third portions than either said first or second housing portions thus forming opposed generally concave areas between said first and second housing portions which serve as holding areas for the endoscope, said concave areas being contiguous with the side walls of said first housing portion; and a power source interface formed in the bottom wall of said first housing portion wherein said interface is completely confined within the volume defined by the walls of said first housing portion and said interface includes a pair of spaced-apart guide rails and at least two electrical contacts.

4. The endoscope of claim 3 wherein said third housing portion is further defined as being contiguous with said bottom and side walls of said first housing portion and defining an opening between said first and second housing portions adjacent said top wall of said first housing portion.

5. The endoscope of claim 3 further comprising:
a power source mounting member having a pair of spaced-apart elongated grooves for engaging said interface rails whereby guiding said grooves onto said rail guides said mounting member onto said interface, and further having at least two electrical contacts which are mechanically grasped by the contacts of said interface when said mounting member fully encounters said interface, said mounting member being mechanically and electrically secured to said first housing portion and, a source of electrical power electrically joined to said mounting member.

6. The endoscope of claim 5 wherein said electrical power source comprises rechargeable battery means secured to said mounting member with said battery means electrodes exposed to enable recharging of said battery means without the necessity of removing said means from said mounting member.

7. The endoscope of claim 5 further comprising:
a pair of electrical conductors; and
swivel connector means secured to said power source mounting member and said electrical conductors electrically joining said conductors to said mounting member electrical contacts while enabling said conductors and said mounting members to be rotated with respect to each other without twisting said conductors.

8. The endoscope of claim 7 further comprising:
a first battery receptacle electrically connected at one end to one of said pair of electrical conductors;
a second battery receptable electrically connected at one end to the other of said pair of electrical conductors; and
a series conductor electrically joining the other ends of said battery receptacles to each other, said series conductor forming a loop with said pair of conductors and said receptacle.

References Cited

UNITED STATES PATENTS

| | | | |
|---|---|---|---|
| 299,277 | 5/1884 | Sheridan | 240—2.18 |
| 376,601 | 1/1888 | Leiter | 128—9 |
| 672,317 | 4/1901 | Dow | 128—9 |
| 1,346,200 | 7/1920 | Harris | 128—9 |
| 1,686,041 | 10/1928 | Smith | 128—9 |
| 2,039,546 | 5/1936 | McGerry | 128—9 |
| 2,098,702 | 11/1937 | Gagnon | 128—9 |
| 2,452,450 | 10/1948 | Fredenburg | 240—218X |
| 2,690,744 | 10/1954 | Wallace | 128—6 |
| 3,111,277 | 11/1963 | Grimsley | 240—2.18X |
| 3,127,115 | 3/1964 | Yellott et al. | 240—10.62 |

FOREIGN PATENTS

| | | | |
|---|---|---|---|
| 1,211,360 | 2/1966 | Germany | 128—6 |

OTHER REFERENCES

Journal of Amer. Medical Assoc., April 5, 1930, vol. 94, No. 14 p. 1064, (copy in Gr. 335).

RICHARD A. GAUDET, Primary Examiner

K. L. HOWELL, Assistant Examiner

U.S. Cl. X.R.

240—2.18; 351—6